United States Patent [19]

Dickey et al.

[11] Patent Number: 5,372,874

[45] Date of Patent: Dec. 13, 1994

[54] DC REACTIVELY SPUTTERED OPTICAL COATINGS INCLUDING NIOBIUM OXIDE

[75] Inventors: Eric R. Dickey, Northfield; Debra M. Steffenhagen, Faribault, both of Minn.

[73] Assignee: Viratec Thin Films, Inc., Faribault, Minn.

[21] Appl. No.: 139,327

[22] Filed: Oct. 19, 1993

Related U.S. Application Data

[63] Continuation of Ser. No. 859,639, Mar. 20, 1992, abandoned, which is a continuation of Ser. No. 575,345, Aug. 30, 1990, abandoned.

[51] Int. Cl.$^5$ .............................. B32B 17/06
[52] U.S. Cl. .................... 428/216; 359/580; 359/585; 359/586; 428/212; 428/469; 428/472; 428/699; 428/701; 428/702; 428/426; 428/913
[58] Field of Search ............ 428/426, 428, 432, 469, 428/472, 699, 701, 702, 216, 212, 913, 697; 359/585, 580, 586; 296/84.1; 52/171

[56] References Cited

U.S. PATENT DOCUMENTS

| | | | |
|---|---|---|---|
| 3,432,225 | 3/1969 | Rock | 350/164 |
| 3,885,855 | 5/1975 | Gross | 428/426 |
| 3,885,855 | 5/1975 | Gross | 428/426 |
| 4,773,717 | 7/1988 | Pai et al. | 359/580 |
| 4,798,994 | 1/1989 | Rijpers et al. | 359/580 |
| 4,827,289 | 5/1989 | Tsuji et al. | 428/627 |
| 4,827,289 | 5/1989 | Tsuji et al. | 428/627 |
| 4,940,636 | 7/1990 | Brock et al. | 428/426 |
| 4,940,636 | 7/1990 | Brock et al. | 428/436 |
| 5,140,457 | 8/1992 | Letter | 359/589 |

FOREIGN PATENT DOCUMENTS

| | | |
|---|---|---|
| 0263541 | of 1988 | European Pat. Off. |
| 0343695 | of 1989 | European Pat. Off. |
| 9110564 | of 1991 | WIPO |
| 9114016 | of 1991 | WIPO |

OTHER PUBLICATIONS

Thin-Film Optical Filters, 2nd ed., Ch. 5, Multilayer High-Reflectance Coatings, Macleod, H. A., Macm-Millan Publishing Company, New York (1986).

Thin-Film Optical Filters, 2nd ed., Appendix Characteristics of Thin-Film Materials, Macleod, H. A., Macmillan Publishing Company, New York (1986).

Three-Layered Reflection-Reducing Coatings, Lockhart, et al., Sep. 1947, J. Opt. Soc. Am. vol. 37, pp. 689–694.

Some Properties and Electrical Instabilities in RF Sputtered Niobium Oxide Films, Chen, Jul. 1972, J. Electrochem. Soc. (USA), vol. 119, No. 7, pp. 887–892.

Preparation, Optical and Dielectric Properties of Vapor Deposited Niobium Oxide Thin Films, Duffy, et al., Feb. 1969, J. Electrochem. Soc. (USA) vol. 116, No. 2, pp. 234–239.

*Primary Examiner*—A. A. Turner
*Attorney, Agent, or Firm*—Heller, Ehrman, White & McAuliffe

[57] ABSTRACT

A multilayer optical coating including at least one layer of niobium oxide deposited by DC reactive sputtering.

15 Claims, 4 Drawing Sheets

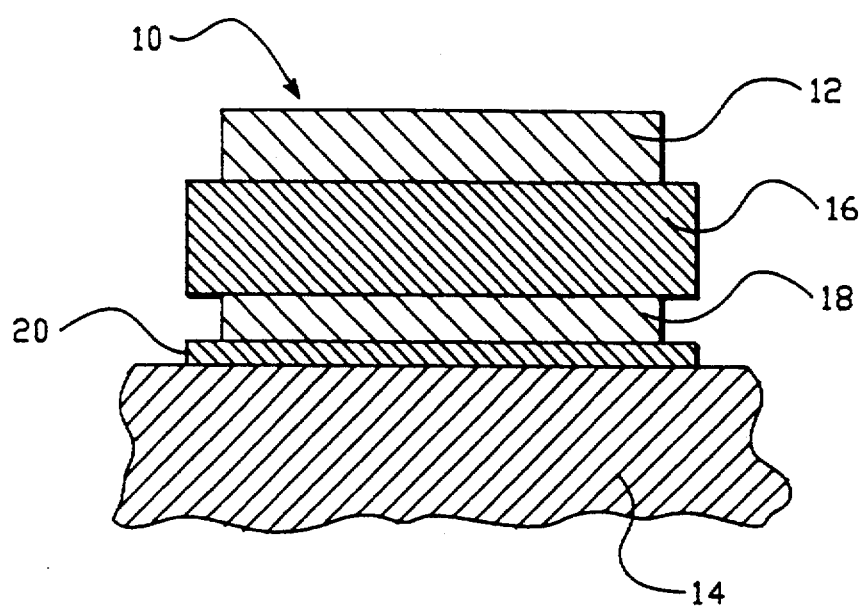
FIG.−1
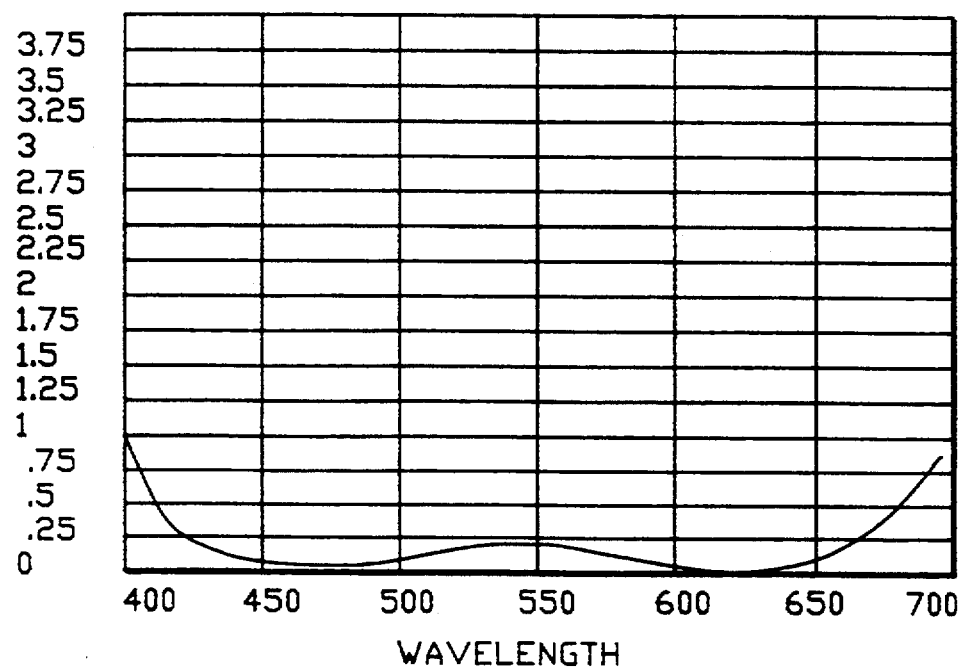
FIG.−2

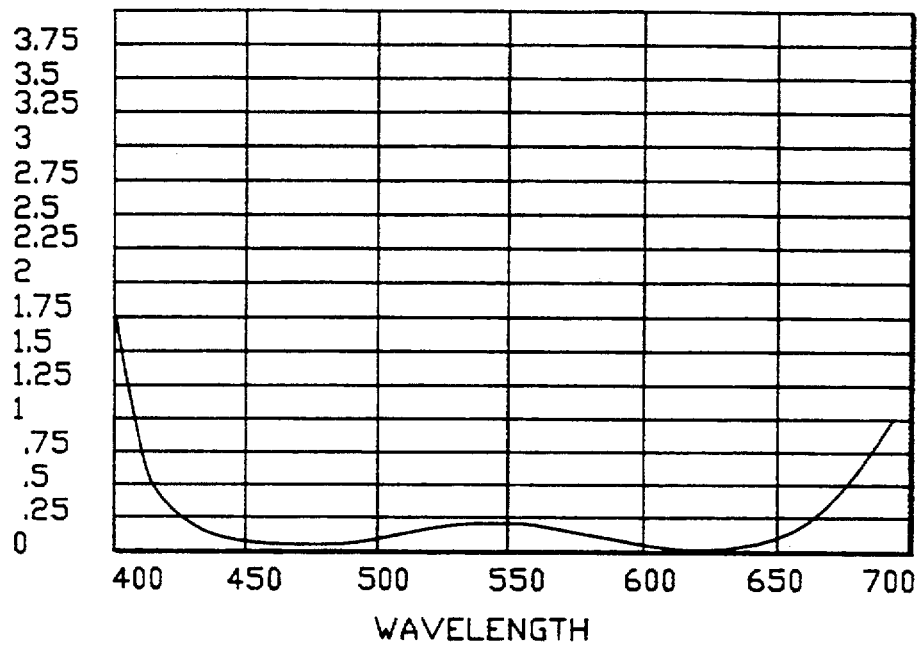
FIG.—3
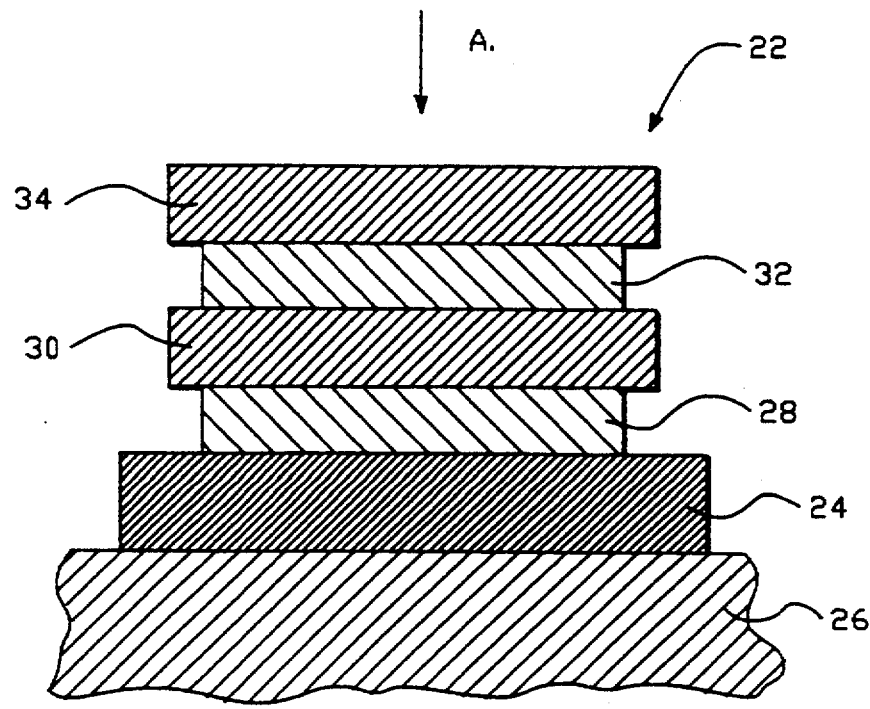
FIG.—4

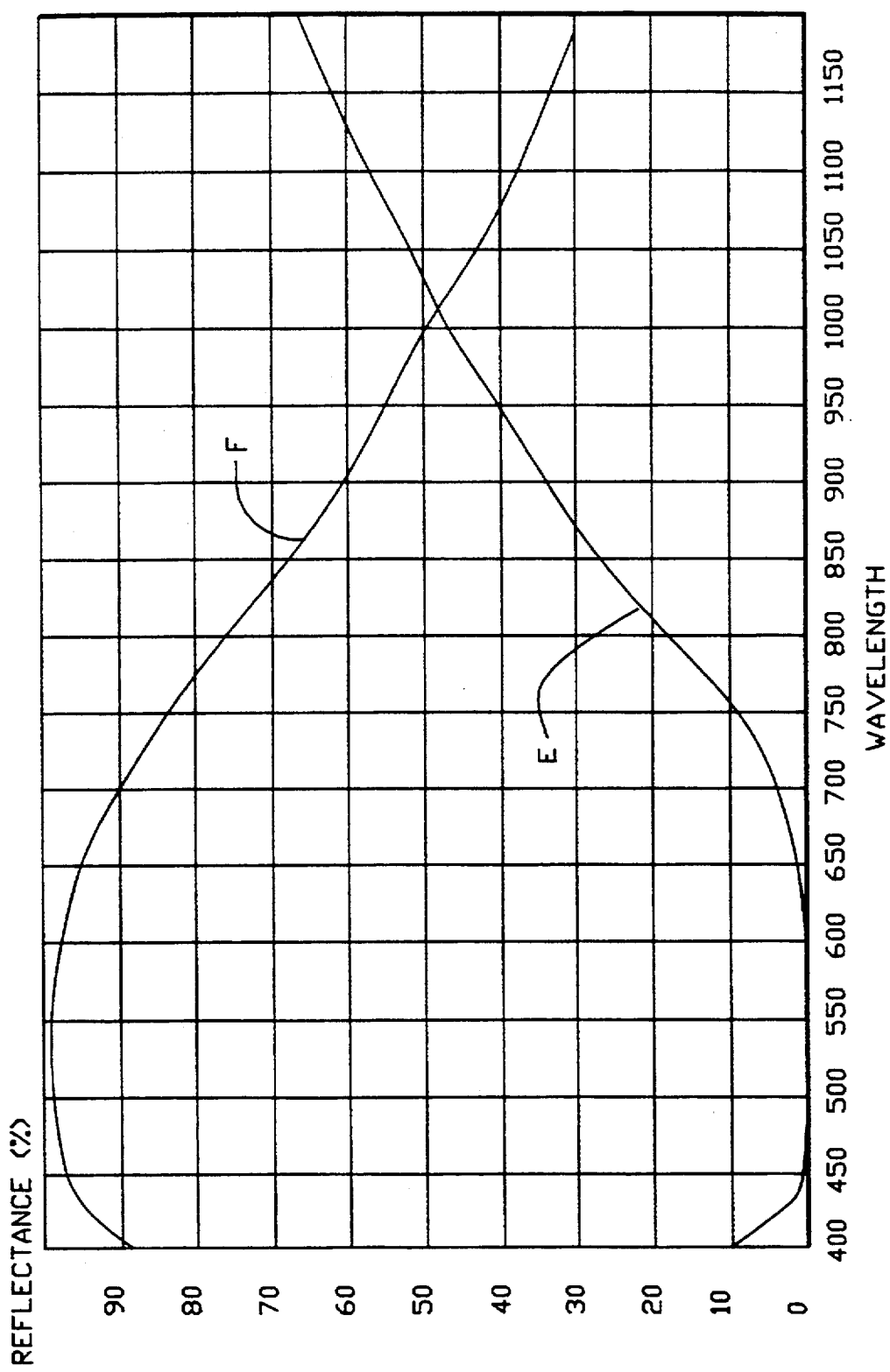
FIG. −7

DC REACTIVELY SPUTTERED OPTICAL COATINGS INCLUDING NIOBIUM OXIDE

This is a continuation of application Ser. No. 07/859,639, filed Mar. 20, 1992; now abandoned which is a continuation of application Ser. No. 07/575,345, filed Aug. 30, 1990, now abandoned.

BACKGROUND OF THE INVENTION

The present invention relates generally to multilayer optical coatings for transparent substrates, and more particularly to such coatings wherein the layers are deposited by DC reactive sputtering.

DC reactive sputtering is the process most often used for large area commercial coating applications. Metal oxide layers, for example, are deposited by sputtering the appropriate metal in an atmosphere including oxygen. In the reactive sputtering process, the articles to be coated are passed through a series of in-line vacuum chambers each including sputtering sources. The chambers are isolated from one another by vacuum locks. Such system may be referred to as an in-line system or simply a glass coater.

Multilayer antireflection coatings are made by depositing two or more layers of transparent dielectric materials on a substrate. At least one of the layers has a refractive index higher than that of the substrate on which the coating is deposited. The coatings may be designed to reduce reflection at all wavelengths in the visible spectrum. The coatings may yield reflection values less than 0.25 percent over the visible spectrum.

The time it takes to deposit a coating is determined mainly by the number of layers and the sputtering rate of the materials. The use of a glass coater to deposit multilayer antireflection coatings can significantly reduce their cost and thus extend their range of application. Such coatings may be used on picture frame glass and a display case, and as thermal control coatings for architectural and automobile glazings.

Most multilayer antireflection coatings are derived from a basic three layer system. The first or outermost layer of the system has a refractive index lower than that of the substrate and an optical thickness of about one-quarter wavelength at a wavelength of about 520 nanometers (nm). The second or middle layer has a refractive index higher than that of the substrate, and an optical thickness of about one-half wavelength at a wavelength of about 520 nm. The third layer, i.e. the layer deposited on the substrate, has a refractive index greater than that of the substrate but less than the refractive index of the second layer. The optical thickness of the third layer is about one-quarter wavelength at a wavelength of about 520 nm. This basic design was first described in the paper entitled "Three Layered Reflection Reducing Coatings", *J. Opt. Soc. Am.*, Vol. 37, Lockhart and King, pp. 689–694 (1947).

A disadvantage of the basic three layer system is that the refractive indices of the layers must have specific values in order to produce the lowest reflectivity. The selection and control of the refractive index of the third layer is particularly important. Departure from specific values of the refractive index can not be compensated for by varying the thicknesses of the layers.

A simple improvement on the Lockhart and King system is described in U.S. Pat. No. 3,432,225, issued to Rock. The Rock system includes four layers. The first or outermost layer has a refractive index lower than that of the substrate and an optical thickness of about one-quarter wavelength at a wavelength of about 520 nm. The second or middle layer has a refractive index higher than that of the substrate and an optical thickness of about one-half to six-tenths of a wavelength at a wavelength of about 520 nm. The third layer has a thickness of about one-tenth of a wavelength at a wavelength of about 520 nm. The refractive index of the third layer is less than that of the second layer. The fourth layer has an optical thickness of about one-tenth of a wavelength at a wavelength of about 520 nm, and a refractive index greater than that of the third layer and the substrate. The third layer may be the same material as the first layer and the fourth layer may be the same material as the second layer.

The Rock system may be used with different combinations of materials. Differences in refractive indices may be compensated for by different layer thicknesses. Magnesium fluoride (MgFl) can be used to form the outer and third layers. If a higher refractive index material were used for the outer layer, then the refractive index of the second layer would also need to be higher to produce the lowest reflectivity.

Magnesium fluoride may be deposited by sputtering but requires a reactive atmosphere including fluorine or hydrogen fluoride. In a layer system, designed for deposition by DC reactive sputtering in a glass coater, the outer layer is usually silicon dioxide ($SiO_2$). Silicon dioxide has a refractive index of about 1.46 at a wavelength of about 520 nm. If the reactive index of the first layer is about 1.46, a second layer having a refractive index of about 2.35 would provide the lowest reflection over the visible spectrum. Titanium dioxide ($TiO_2$) has a refractive index of about 2.35 at a wavelength of about 520 nm. As such, it is commonly used as the high refractive index material in a system deposited by DC reactive sputtering.

The Rock system may require approximately equal thicknesses of titanium dioxide and silicon dioxide. Silicon dioxide may be sputtered four times faster than titanium dioxide. In order to operate at optimum speed, a glass coater may require four times as many sputtering cathodes for titanium dioxide as for silicon dioxide. However, the coater may not have enough chambers to accommodate all of these titanium dioxide cathodes. Thus, the deposition rate for the silicon dioxide will have to be reduced to "keep pace" with the deposition rate of the titanium dioxide. This reduces output and increases production costs.

Materials such as tin oxide ($SnO_2$) and zinc oxide (ZnO) may be deposited by DC reactive sputtering at a rate at least six times faster than that of titanium oxide. These materials, however, have a refractive index of about 1.9 at a wavelength of 520 nm. The photopic reflection of a four layer antireflection coating using zinc oxide or tin oxide as the second layer would only be about 0.4 percent. The low DC reactive sputter rate for titanium dioxide also presents difficulties in the deposition of highly-reflecting coatings. Highly-reflecting coatings include enhanced metal reflectors which have a metal layer overcoated with low and high refractive index materials. Enhanced reflectors may have four such overcoating layers, including two high and two low refractive index layers arranged alternately. The overcoating layers each have an optical thickness of about one-quarter wavelength at a wavelength of about 520 nm. A low refractive index layer is in contact with the metal layer. The refractive index of the high refractive index material should be as high as possible and the refractive index of the low refractive index material should be as low as possible. This provides optimum reflection enhancement. The high and low index materials should also not absorb visible light.

In the architectural glass coating industry, zinc oxide is used as a layer material for the formation of low emissivity (E) coatings. These coatings are designed to reflect long wavelength infrared radiation while transmitting visible light. They also have a low reflection for visible light from at least one surface. A low E coating may comprise three layers, for example, a silver layer bounded by two dielectric layers. The silver layer must be thick enough to provide high infrared reflection. The dielectric layers reduce reflection from the silver layer in the visible spectrum and thus enhance light transmission through the coated glass. The silver layer is preferably between about 10 and 15 nm thick. The refractive index of the dielectric layers should be relatively high. A material with a refractive index of about 2.35 at a wavelength of about 520 nm, such as titanium dioxide, would be preferred over zinc oxide for the reflection-reducing layers.

Zinc oxide has a refractive index of about 1.9 at a wavelength of about 520 nm. The higher index permits the use of a thicker silver layer while maintaining low visible light transmission and high reflection. For example, using zinc oxide dielectric layers, a silver layer about 8 nm thick produces the lowest reflectivity. For titanium oxide dielectric layers, a silver layer about 130 nm thick produces the lowest reflectivity. The thicker silver layer may also provide higher reflection at longer wavelengths, i.e. a lower emissivity. The thicker silver layer may also provide a higher reflection and lower transmission in the near infrared spectrum, reducing the solar heat load. The industry preference for zinc oxide is substantially based on its high sputtering rate. The lower production costs afforded by the high sputtering rate may be sufficient to justify the less than optimum optical performance. The durability of a layer system incorporating zinc oxide is also poor due to zinc oxide's softness.

It is widely believed that materials which can be deposited at high rates by DC reactive sputtering have relatively low refractive indices. Deposition rate comparisons may be slightly inconsistent from source to source. The type of machine and cathode used may also influence the results. The following approximate rate comparisons serve to illustrate the generalization. The refractive index values cited are the approximate values at a wavelength of about 520 nm. Titanium dioxide has a refractive index of about 2.35, and tantalum oxide ($Ta_2O_5$) has a refractive index of about 2.25. Tantalum oxide may be deposited at about twice the rate of titanium dioxide. Zirconium oxide ($ZrO_2$) has a refractive index of about 2.15 and may be deposited at about twice the rate of titanium dioxide. Tin oxide has a refractive index of about 1.95 and may be deposited at about ten times the rate of titanium dioxide. Zinc oxide has a refractive index of about 1.90 and may be deposited at about ten times the rate of titanium dioxide.

The above-described relationship between the refractive index and the sputtering rate implies that high deposition rates are achievable only with materials having relatively low refractive indices. A more probable explanation, however, is that zinc oxide and tin oxide are semiconductors. As such, oxide build-up on a sputtering target of zinc or tin may not create an insulating layer which lowers the sputtering rate. High oxygen-flow rates are thus possible in the sputtering gas without loss of power. As such, higher oxide deposition rates are possible.

Accordingly, it is the object of the present invention to provide a high refractive index material having a refractive index which is approximately equal to that of titanium dioxide but which may be deposited by DC reactive sputtering at a rate at least four times faster than titanium dioxide and preferably at a rate comparable to zinc oxide.

It is a further object of the present invention to provide a high refractive index material having a high DC reactive sputtering rate which is durable and abrasion resistant.

It is another object of the present invention to provide a simple antireflection layer system which may be deposited at low cost in a large area, in-line sputtering machine.

It is yet another object of the present invention to provide a simple enhanced reflector coating which may be deposited at low cost in a large area in-line sputtering machine.

SUMMARY OF THE INVENTION

The present invention is directed a multilayer optical coating comprising substantially at least one layer of niobium oxide deposited by DC reactive sputtering. At least one other layer having a refractive index different from the niobium oxide layer adjoins the niobium oxide layer. The niobium oxide layer may comprise different oxides of niobium and may include certain impurities or dopants. The optical coating may be, for example, an antireflection coating or an enhanced metal reflector.

The niobium oxide layer may be deposited two to five times faster than titanium dioxide, under the same sputtering conditions. The reactive index of the niobium oxide layer is about 2.45 at a wavelength of about 400 nm, 2.35 at wavelength of about 520 nm, and 2.30 at a wavelength of about 700 nm.

A four layer antireflection coating including niobium oxide and silicon dioxide layers may have a photopic reflectivity less than about 0.15 percent.

Coatings including niobium oxide layers may be less expensive to produce since they may be deposited at high production rates. The lower cost may extend the application of such coatings to new and useful areas such as antireflection coatings on architectural and automobile glazings.

DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below serve to explain the principles of the invention.

FIG. 1 schematically illustrates a four layer antireflection coating.

FIG. 2 is a graphical representation illustrating computed reflection values as a function wavelength of a four layer antireflection coating in accordance with the present invention.

FIG. 3 is a graphical representation illustrating computed reflection values as a function of wavelength for a four layer antireflection coating using titanium dioxide and silicon dioxide.

FIG. 4 schematically illustrates an enhanced reflector coating in accordance with the present invention.

FIG. 7 is a graphical representation illustrating computed reflection and transmission values as a function of wavelength for a low emissivity coating in accordance with the present invention.

DETAILED DESCRIPTION OF THE INVENTION

Figure 5:
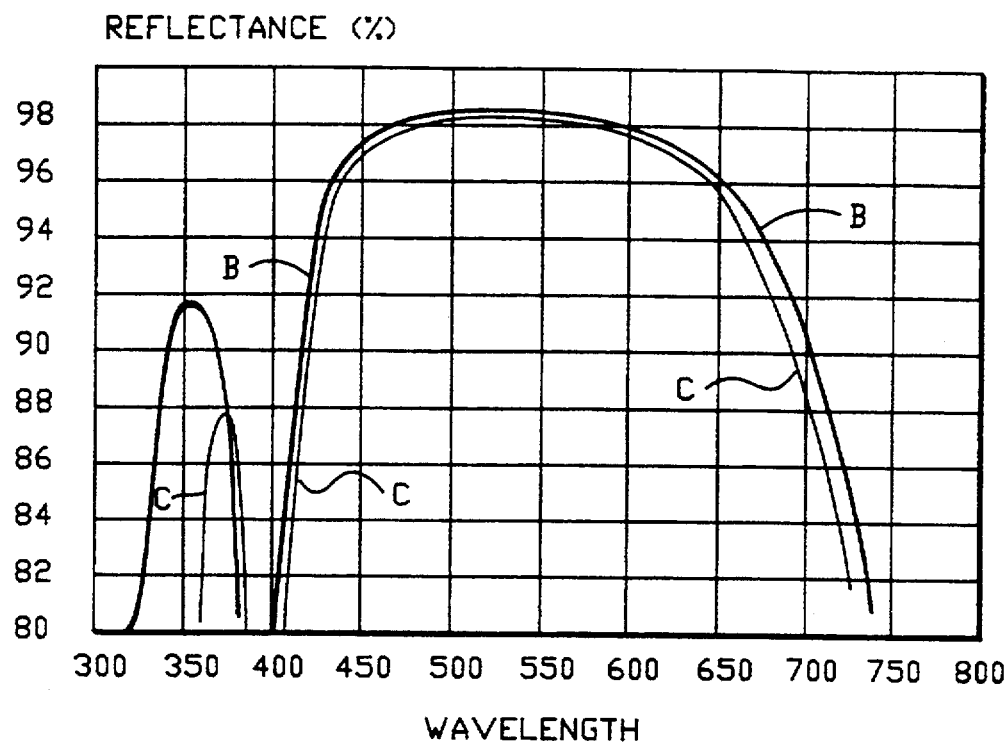
FIG. 5 is a graphical representation illustrating computed reflection values as a function of wavelength for a four layer enhanced reflector coating in accordance with the present invention.

The present invention is directed to multilayer coatings incorporating at least one DC reactively sputtered niobium oxide ($Nb_2O_5$) layer. These layers are durable and absorb very little, if any, visible light. Niobium oxide has a refractive index of about 2.35 at a wavelength of about 510 nm. It may be deposited about six times faster than titanium dioxide. As such, the use of niobium oxide in place of titanium oxide can provide a three-fold increase in the production rate. Moreover, the increased rate of production is achieved without a loss in optical performance. Indeed, the DC reactively sputtered niobium oxide has a lower dispersion than titanium oxide which results in improved performance for certain systems.

The niobium oxide layers may be deposited, by DC reactive sputtering, in an ILS 1600 in-line sputtering apparatus available from Airco Coating Technologies of Fairfield, Calif. The sputtering cathode can be a 6" round planar magnetron obtainable from VacTec Inc. in Boulder, Co. The target may be made from 99.9% niobium obtainable from Cerac Inc. of Milkwaukee, Wis. The niobium oxide may be sputtered at a voltage of $-604$ volts, and a sputtering pressure of 3.8 millitorr. The sputtering gas may be a mixture of argon and oxygen wherein the flow rate for the oxygen and argon is about 14.5 sccm (standard cubic centimeters per minute) and 45 sccm, respectively. Layers of various thickness are deposited by maintaining the above-described sputtering conditions and varying the rate at which substrates pass beneath the cathodes. The optical constants of a niobium oxide layer, i.e. the refractive index (n) and the extinction coefficient (k), are determined from reflection and transmission measurements of layers of known physical thickness. Sample results at different wavelengths are given in Table 1.

TABLE 1

| Wavelength (nm) | n | k |
|---|---|---|
| 380 | 2.490 | 0.002 |
| 400 | 2.451 | 0.001 |
| 420 | 2.428 | 0.000 |
| 440 | 2.408 | 0.000 |
| 470 | 2.382 | 0.000 |
| 510 | 2.352 | 0.000 |
| 550 | 2.332 | 0.000 |
| 600 | 2.317 | 0.000 |
| 650 | 2.307 | 0.000 |
| 700 | 2.300 | 0.000 |
| 750 | 2.297 | 0.000 |
| 850 | 2.293 | 0.000 |

At a wavelength of 520 nm, nominally in the middle of the visible spectrum, titanium dioxide will have a refractive index of about 2.35, which is about the same as the refractive index of niobium oxide. At a wavelength of 400 nm, titanium dioxide will have a refractive index of about 2.54, and the refractive index of niobium oxide will be about 2.428. At a wavelength of 700 nm, titanium dioxide will have a refractive index of about 2.26 compared with 2.30 for niobium oxide. As can be seen, the niobium oxide layers are significantly less dispersive than the titanium dioxide layers, while having essentially the same refractive index in the middle of the visible spectrum.

The deposition rate for the niobium oxide is up to about five times faster than that of titanium dioxide under the same sputtering conditions. The niobium oxide layers are as abrasion and scratch resistant as titanium oxide layers. Thus, niobium oxide layers may be substituted for titanium dioxide layers in optical coatings without compromising the optical or physical properties of the system.

As shown in FIG. 1, the present invention may be in the form of a Rock-type antireflection coating. The coating or layer system 10 may be formed on a glass or plastic substrate 14. The refractive index of substrate 14 may be about 1.52 at a wavelength of about 520 nm.

The coating 10 comprises a series of layers 12, 16, 18 and 20. The first or outermost layer 12 has a low refractive index, preferably lower than that of substrate 14. The optical thickness of layer 12 is about one-quarter wavelength at a wavelength of about 510 nm. The second layer 16 has a high refractive index and an optical thickness about twice that of layer 12. The third layer 18 has a relatively low refractive index, and fourth layer 20 has a high refractive index. The total optical thickness of layers 18 and 20 is generally less than about one-quarter wavelength at a wavelength of about 510 nm. The refractive indices of layers 12 and 16 must have a specific relationship to yield the lowest reflection across the visible spectrum.

In DC reactively sputtered coatings, the preferred material for layer 12 is silicon dioxide. This material is preferred because it is durable and readily deposited by DC reactive sputtering. Silicon dioxide has a refractive index of about 1.46 at a wavelength of about 520 nm and the physical thickness of layer 12 may be about 85.2 nm. Layer 18 is also preferably silicon dioxide, and its physical thickness may be about 35.1 nm.

Layers 16 and 20 are DC reactively sputtered niobium oxide. Layer 16 has a physical thickness of about 113.9 nm and layer 20 has a physical thickness of about 11.8 nm. The refractive index of layers 16 and 20 is about 2.35 at a wavelength of about 520 nm. The computed reflection performance for coating 10 on substrate 14 is shown in FIG. 2.

FIG. 3 shows the computed reflection performance for a four layer system like that of FIG. 1 wherein the outermost layer is silicon dioxide having a physical thickness of about 87.2 nm. The second and fourth layers are titanium dioxide with physical thicknesses of about 109.2 nm and 16.8 nm, respectively. The third layer is silicon dioxide having a physical thickness of about 30.8 nm. The refractive index of the substrate is about 1.52 at a wavelength of about 520 nm.

A comparison of FIG. 2 and FIG. 3 indicates that the substitution of niobium oxide for titanium dioxide in the four layer coating has no adverse effect on its optical performance. The coating of the present invention, however, may be deposited about three times faster than a coating using titanium dioxide. The coating of the present invention also has a slightly superior optical performance. For example, the reflection values for coating 10 (see FIG. 2) at the extremes of the visible spectrum, i.e. at about 425 nm and 675 nm, are lower by a factor of two. This performance differential is due to the lower index dispersion of the niobium oxide layers compared with the titanium dioxide layers.

As shown in FIG. 4, another embodiment of the present invention is a multilayer enhanced reflector coating 22. The layer system 22 comprises a metal layer 24 adjacent to substrate 26. The coating 22 further includes low refractive index layers 28 and 32, and high refractive index layers 30 and 34. The optical thickness of each layer 28, 30, 32, and 34 is about one-quarter wavelength at a wavelength of about 510 nm. The substrate 26 may be any material on which a polished, or specular reflecting surface, may be created. The coating 22 is configured to be viewed in the direction shown by Arrow A.

The layer 24 of coating 22 may be aluminum having a physical thickness of about 200 nm. The layers 28 and 32 may be silicon dioxide with a physical thickness of about 75.3 nm and 90.6 nm, respectively. The layers 30 and 34 are DC reactively sputtered niobium oxide having a physical thickness of about 50.5 nm and 50.7 nm, respectively. The computed reflection values for coating 22 having such dimensions is shown by Curve B of FIG. 5.

Curve C of FIG. 5 shows the performance of a coating using titanium dioxide instead of niobium oxide. Specifically, such a coating comprises an aluminum layer adjacent the substrate and having a physical thickness of about 200 nm. The silicon dioxide layers have a physical thickness of about 79.8 nm and 92.6 nm, respectively. The innermost and outermost titanium dioxide layers have a physical thickness of about 50.3 nm and 50.6 nm, respectively.

A comparison of Curves B and C indicates that the reflection performance of the two coatings in the visible spectrum is about the same. However, the niobium oxide coating 22 has a significantly higher reflectivity at the extremes of the visible spectrum, i.e. at about 425 nm and 675 nm. This is due to the fact that niobium oxide has a lower dispersion than titanium dioxide. The niobium oxide-based coating may also be deposited at a rate about fifty percent faster than that of a titanium oxide-based coating.

Figure 6:
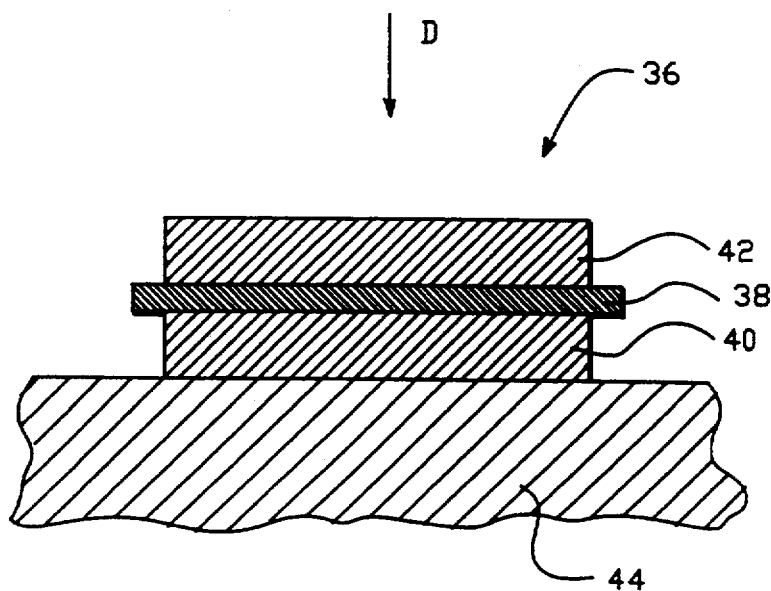
FIG. 6 schematically illustrates a three layer low emissivity coating in accordance with the present invention.

Yet another embodiment of the present invention is a low emissivity (E) coating 36 shown in FIG. 6. The low E coating or layer system 36 comprises a metal layer 38 bounded on either side by transparent dielectric layers 40 and 42. Layer 38 may be silver having a physical thickness of about 13.9 nm. Layers 40 and 42 are DC reactively sputtered niobium oxide with a physical thickness of about 34.4 and 36.6 nm, respectively. The substrate 44 may be glass or plastic. The layer system is viewed in the direction of Arrow D.

The computed reflection (curve E) and transmission (curve F) values for coating 36 is shown are FIG. 7. A low E coating including titanium dioxide layers would have essentially the same optical performance. The niobium oxide system, however, may be deposited about three times faster than the titanium dioxide system.

The low E coating 36 may also use gold or copper for metal layer 38. The thickness of layer 38 may be between about 5 and 25 nm, depending on the metal layer, materials 40 and 42, and the desired optical performance.

Many types of multilayer optical coatings can be deposited by DC reactive sputtering in an in-line sputtering machine. These may include various antireflection coatings, multilayer dielectric mirrors and bandpass filters. Multilayer dielectric reflectors include a plurality of alternating high and low refractive index materials having an optical thickness of about one-quarter wavelength at the wavelength at which maximum reflection is desired. Bandpass filters can include multilayer dielectric reflectors and one or more layers about one-half wavelength in optical thickness. It will be apparent from the above that should coatings require one or more layers having a refractive index of about 2.35, niobium oxide may be used in preference to titanium dioxide to increase the speed of the deposition process.

The above embodiments have been described as including niobium oxide ($Nb_2O_5$). It will be apparent to those familiar with the art that these layers may include various sub-oxides of Niobium. It will also be apparent that certain impurities or dopants may be involved in the niobium oxide layer to increase the conductivity of the niobium oxide layer and potentially increase the sputtering rate.

The present invention has been described in terms of a number of embodiments. The invention however is not limited to the embodiments depicted and described. Rather the scope of the invention is defined by the appended claims.

What is claimed is:

1. A multilayer reflective coating, comprising:
a layer of aluminum; at least two other layers deposited on said layer of aluminum, said two other layers including a first layer of niobium oxide substantially non-absorbing for visible light and deposited by DC reactive sputtering and a second layer of a dielectric material having a refractive index lower than niobium oxide;
said first and second layers each having an optical thickness of about one-quarter wavelength at a wavelength of about 510 nanometers; and
said second layer located between said first layer and said aluminum layer.

2. The coating of claim 1 wherein said second layer includes silicon dioxide.

3. A multilayer reflective coating, comprising:
an aluminum layer; deposited on said aluminum layer at least four layers including a first DC reactively sputtered niobium oxide layer substantially non-absorbing for visible light, located farthest from said aluminum layer, a second DC reactively sputtered niobium oxide layer substantially non-absorbing for visible light and two other layers of a dielectric material having a refractive index lower than niobium oxide, one of said two other layers located between said first and second DC reactively sputtered niobium oxide layers and the second of said two other layers located between said second DC reactively sputtered niobium oxide layer and said aluminum layer; and said four layers each having an optical thickness of about one-quarter wavelength at a wavelength of about 510 nanometers.

4. The coating of claim 3 wherein said two other layers include silicon dioxide.

5. A low emissivity coating, comprising:
a layer of silver; and first and second layers of DC reactively sputtered niobium oxide substantially non-absorbing for visible light, said first and second layers disposed on opposite sides of said silver layer.

6. The coating of claim 5 wherein said first layer of DC reactively sputtered niobium oxide has a physical thickness of about 34.4 nanometers, said second layer of DC reactively sputtered niobium oxide has a thickness of about 36.6 nanometers, and said silver layer has a thickness of about 13.9 nanometers.

7. An anti-reflection coating for a substrate, comprising:
   four layers substantially transparent to visible light and designated the first, second, third and fourth layers in consecutive numerical order beginning with the layer farthest from the substrate;
   said first layer having a refractive index lower than said substrate and having an optical thickness of about one-quarter wavelength at a wavelength of about 520 nanometers;
   said second layer being a layer of DC reactively sputtered niobium oxide having an optical thickness between about one-half and six-tenths of a wavelength at a wavelength of about 520 nm;
   said third layer having a refractive index lower than niobium oxide;
   said fourth layer being a layer of DC reactively sputtered niobium oxide; and
   said third and fourth layers having a total optical thickness less than about one-quarter wavelength at a wavelength of about 510 nanometers.

8. The anti-reflection coating of claim 7 wherein said first and third layers are silicon dioxide.

9. A multilayer optical coating, comprising:
   at least one DC reactively sputtered niobium oxide layer substantially nonabsorbing for visible light; adjoining said niobium oxide layer at least one transparent dielectric layer having a refractive index different from niobium oxide; and a metal layer adjoining said dielectric layer.

10. The coating of claim 9 wherein said dielectric layer includes silicon dioxide.

11. A low emissivity coating, comprising:
   a layer of metal; and first and second layers including DC reactively sputtered niobium oxide substantially non-absorbing for visible light, said first and second layers disposed on opposite sides of said metal layer.

12. A multilayer reflective coating, comprising:
   a layer of metal; at least two other layers deposited on said layer of metal, said two other layers including a first layer incorporating niobium oxide substantially non-absorbing for visible light and deposited by DC reactive sputtering and a second layer of a dielectric material having a refractive index lower than niobium oxide;
   said first and second layers each having an optical thickness of about one-quarter wavelength at a wavelength of about 510 nanometers; and
   said second layer located between said first layer and said metal layer.

13. A multilayer reflective coating, comprising:
   a layer of metal; at least two other layers deposited on said layer of metal, said two other layers including a first layer incorporating niobium oxide substantially non-absorbing for visible light and deposited by DC reactive sputtering and a second layer of a dielectric material having a refractive index lower than niobium oxide;
   said first and second layers each having an optical thickness of about one-quarter wavelength at a wavelength of about 510 nanometers; and
   said second layer located between said first layer and said metal layer.

14. A multilayer optical coating, comprising:
   at least one layer including DC reactively sputtered niobium oxide that is substantially non-absorbing for visible light; adjoining said niobium oxide layer at least one transparent dielectric layer having a refractive index different from niobium oxide; and a metal layer adjoining said dielectric layer.

15. The coating of claim 14 wherein said dielectric layer includes silicon dioxide.

* * * * *

UNITED STATES PATENT AND TRADEMARK OFFICE
CERTIFICATE OF CORRECTION

PATENT NO. : 5,372,874

DATED : December 13, 1994

INVENTOR(S) : Eric R. Dickey et al.

It is certified that error appears in the above-identified patent and that said Letters Patent is hereby corrected as shown below:

Delete claim 13.

Renumber claim 14 as claim 13.

Renumber claim 15 as claim 14.

Column 10, line 39, replace "14" with --13--.

Signed and Sealed this

Twenty-seventh Day of February, 1996

Attest:

BRUCE LEHMAN

Attesting Officer

Commissioner of Patents and Trademarks